UNITED STATES PATENT OFFICE.

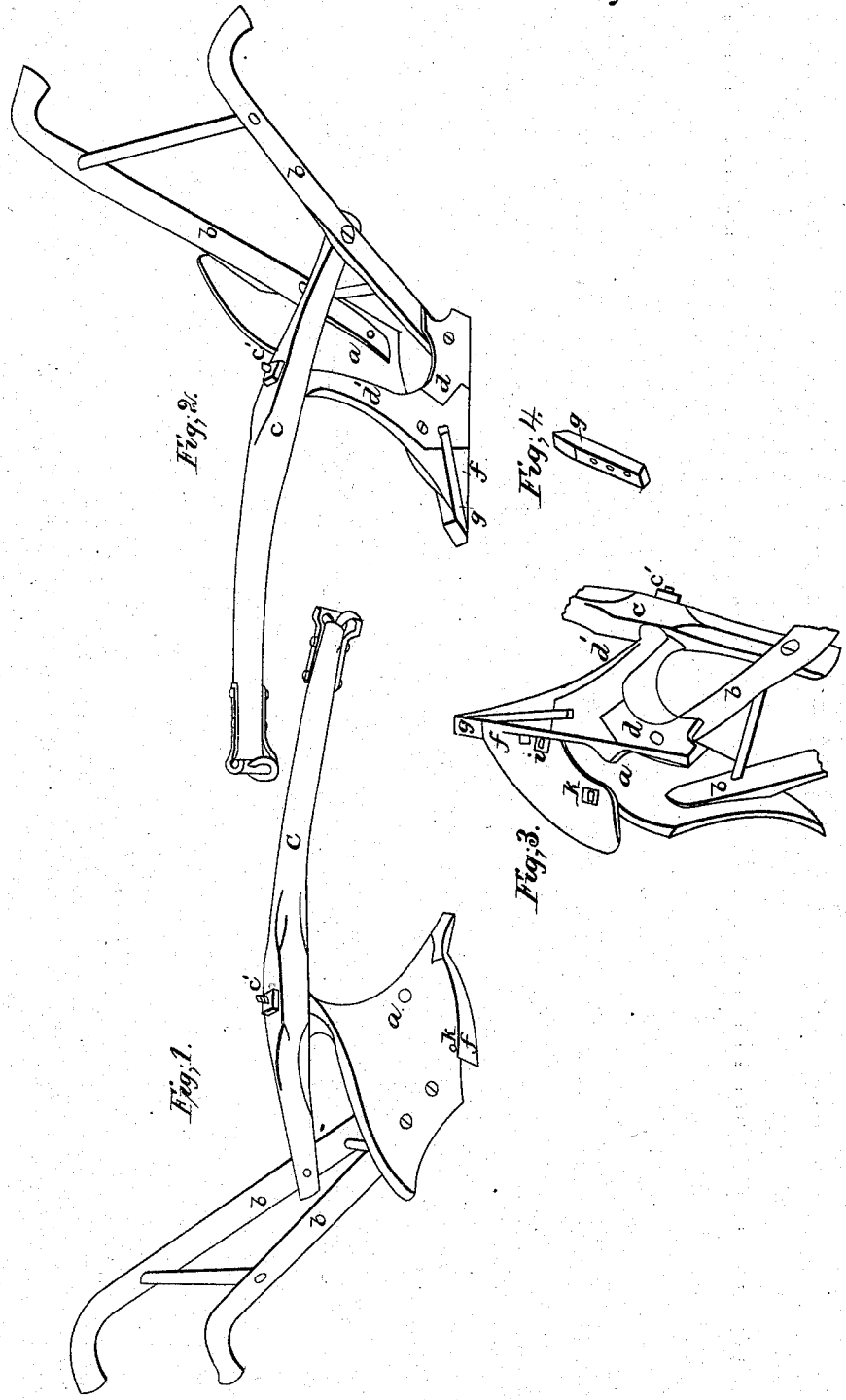

J. S. EASTMAN, ASSIGNEE OF GEORGE CLEZY, OF BALTIMORE, MARYLAND.

IMPROVEMENT IN PLOWS.

Specification forming part of Letters Patent No. 3,266, dated September 14, 1843.

*To all whom it may concern:*

Be it known that I, GEORGE CLEZY, of the city and county of Baltimore, Maryland, have invented a new and useful Improvement in Plows; and I do hereby declare that the following is a full, clear, and exact description thereof, reference being had to the accompanying drawings, in which—

Figure 1 is the mold-board side; Fig. 2, landside; Fig. 3, perspective showing the under side; Fig. 4, point detached.

The nature of my invention consists in forming a self-sharpening point and inserting it in the landside, the front lower edge of which is formed by the share, both of them being fastened by the same bolt.

The mold-board *a*, handles *b*, and beam *c* are formed on the most approved models now in use, the upper front corner of the mold-board being attached to the beam by a bolt which passes through both and is fastened by a screw, *c'*, on the top of the beam. The standard *d'* on the landside *d* is cast onto the front of the mold-board, and in the front end of this standard there is a notch below, near the ground, to receive the end of the self-sharpening point, hereinafter described. The mold-board projects forward over said point and forms the upper side of the socket which receives it. The under side of the socket is formed about three-fourths of the distance from the point by the share *f*, which projects across and makes the front end of the landside. The socket above named slants from the front at an angle of about twenty degrees.

The point *g* is an oblong bar, the forward and lower end being sharpened into a wedge form. It has two, three, or more holes through it, and a bolt that passes down through the mold-board. One of these holes and a hole opposite in the share beneath secures them all by a nut, *i*, or key underneath. The share is further secured by one or more bolts, *k*, passing through it and the mold-board.

As the point wears away it can be turned over and slipped foward as occasion requires, and when the share is renewed the front end of the landside is also renewed again, they being in one piece.

The hind end of the landside is a piece separate from the middle part to which the standard is attached, and they are fastened together by bolts in any convenient way.

Having thus fully set forth my improvement in the plow, what I claim therein as new, and for which I desire Letters Patent, is—

The combination of the point *g* with the share *f* and mold-board, constructed and arranged in the manner and for the purpose described, the share and mold forming the socket in which the point is held.

GEORGE CLEZY.

Witnesses:
C. BROWN,
A. H. PENINGTON.